PASSIVE ELECTRIC NETWORKS FOR MAGNETIC STORAGE SYSTEM

Filed April 25, 1962 7 Sheets-Sheet 1

INVENTOR.
HUGH M. SIERRA

BY George E. Roush

ATTORNEY

Nov. 2, 1965 H. M. SIERRA 3,215,995

PASSIVE ELECTRIC NETWORKS FOR MAGNETIC STORAGE SYSTEM

Filed April 25, 1962 7 Sheets-Sheet 2

Nov. 2, 1965 H. M. SIERRA 3,215,995

PASSIVE ELECTRIC NETWORKS FOR MAGNETIC STORAGE SYSTEM

Filed April 25, 1962 7 Sheets-Sheet 7

United States Patent Office 3,215,995
Patented Nov. 2, 1965

3,215,995
PASSIVE ELECTRIC NETWORKS FOR MAGNETIC STORAGE SYSTEM

Hugh Manuel Sierra, San Jose, Calif., assignor to International Business Machines Corporation, New York, N.Y., a corporation of New York Filed Apr. 25, 1962, Ser. No. 190,075
3 Claims. (Cl. 340—174.1)

The invention relates to electric networks used in magnetic data storage systems, and it particularly pertains to passive electric networks for increasing the resolution of magnetically recorded binary information.

Many digital computers and data processing systems employ a magnetizable storage medium on which data are recorded in binary form by one or more associated recording electromagnetic transducers which produce magnetization of various discrete incremental areas of the recording surface. A popular method of magnetic recording is the modified non-return-to-zero form commonly referred to as NRZI recording. In this method of recording, binary digits or "bits" of one nature (for example "units" or "ones") are represented by changes in the direction of the magnetization of incremental areas under the recording transducer and the other binary digits ("naughts" or "zeros") are represented by the absence of changes in the direction of magnetization of the corresponding incremental areas of the storage medium. In reproducing the recorded binary data, a reproducing electromagnetic transducer (which frequently is the same transducer utilized in recording) is moved relative to the recording medium and the output of this transducer is sampled once for each bit interval under the control of a clock to determine whether or not a change in the direction of magnetization occurred in the underlying recording medium.

A common method for detecting pulses in the reproduced signal is an "amplitude sensing" system in which a bias is applied at the input of the detection apparatus so that only signals in excess of a predetermined amplitude are detected. The portion of the reproduced signal which exceeds the input bias is then applied to an overdriven amplifier to square each pulse, and the leading edge is then used as a bit time reference. This system operates on the assumption that signals in excess of the bias amplitude represent genuine reversals of magnetization of the underlying area, while pulses having an amplitude less than the predetermined bias level represent noise. Such a system works well with an input signal of reasonably constant amplitude, but with an input signal amplitude varying over a wide range, as is often the case in digital recording, the relative time positions of the leading edges of the squared pulses shift according to the amplitude of the input pulses. Since it is desirable to increase bit densities in recording and consequently reduce the time allotted for a single bit, the widths of the squared pulses in an amplitude sensing system often become greater than the allotted bit time, resulting in interference by adjacent bits. Because each bit must be accurately clocked during its corresponding bit interval, this inter-bit interference and shifting is highly objectionable and may lead to bit detection misinterpretation.

Another common detection scheme is a "peak sensing" system. The peak of each detected pulse is determined, rather than the leading edge as in the amplitude scheme mentioned above. Usually peaks are sensed by first differentiating the reproduced signal to produce a waveform in which the amplitude at each point is proportional to the rate of change of amplitude of the reproduced signal. Thus, for a single positive going input pulse, the differentiated signal first rises to a positive maximum and then falls toward a negative maximum, and in doing so passes through zero amplitude at a time corresponding to the peak of the input pulse. By determining the instant at which the differentiated signal passes through zero value, amplitude variations of the input signal are essentially nullified. While peak sensing is substantially independent of amplitude variations, it is still subject to bit shift where the bits are so closely packed that interbit interference causes the peaks of adjacent pulses to shift considerably with respect to each other, so that the sampling may misinterpret the pattern.

In most magnetic reproduction operations, the spectral response of the reproduction signal plotted on a logarithmic scale as a function of frequency is a curve which increases in amplitude gradually from zero, until it reaches a maximum amplitude at some peak frequency, and then drops back toward zero more sharply than the rise portion. Although the particular configurations of such a curve will vary in the different recording components, the general shape of all such characteristics is the same. Heretofore, in attempting to improve magnetic playback systems, the approach has been to flatten the characteristic to produce a constant amplitude over all or substantially all of the frequency range over which the system is operated. Thus in audio-frequency systems, for example, amplitude equalizers are utilized in an attempt to achieve a substantially flat characteristic over the entire audio-frequency range. Although this approach is satisfactory in audio-frequency applications, digital data recording poses requirements considerably more stringent.

Considering the magnetic reproduction process, it will be appreciated that in the dynamic reconstitution of magnetically recorded information, a differentiation process is involved since the voltage generated in the reproducing transducer is a function of the rate of change of magnetic flux adjacent the transducer. Thus, in the absence of band limiting factors, the idealized response of a magnetic reproduction system to an impulse input would be a pulse output. Similarly, a simple pulse input to such a network would result in a bi-pulse output. However, it is well understood that there are several factors involved in magnetic reproduction which limit the frequency band obtainable. The most significant of these factors is the spacing between the transducers and the record surface, the width of the gap in the reproducing transducer, and the nature of the record surface itself. These factors contribute to the attenuation of higher frequencies in a magnetic read back system, and since the peak frequency obtainable directs the bit rate obtainable in the system, an object to increase the peak frequency of the response follows:

One solution to the problem is found in the copending U.S. patent application Serial No. 153,520 of Carl A. Schlaepfer, filed November 20, 1961. Instead of attempting to equalize the response of the output of the reproduction transducer to uniform amplitude over the entire frequency range, this solution is based on extending the slope which is inherent in the reproducing transfer characteristic as the result of the differentiation process involved to obtain a more perfect differentiation for increasing the frequency response range of the entire system. This extension of the frequency range is accomplished by inserting a correcting device into the reproduction signal path prior to detection to effect a narrowing in width of the reproduced pulses so that they may be more readily detected without interference from adjacent pulses.

This solution involves the use of active as well as passive electric components. While this solution is highly effective, the necessity of using active components lessens the overall value of the arrangement, because the predictable change in characteristics of operation as the active elements age in the circuit prevent consistent correction throughout the life of the system. Although the desirability of the completely passive network was realized, it was believed after thorough investigation that it would not be possible to obtain the desired results with an entirely passive network. Therefore previous solutions reluctantly incorporated active circuit elements as well as passive ones.

Accordingly an object of the invention is to improve the resolution of the reproduction of magnetically stored information in binary digital form as employed in magnetic storage devices for data processing systems.

Another object of the invention is to provide a purely passive network for so improving the resolution.

The resolution of data recorded on a magnetic recording medium is increased by means of a passive electric network interposed between the reproducing electromagnetic transducer and a substantially constant load coupled to that transducer, such as an electronic amplifier followed by a binary data sensing detector. The passive electric network according to the invention has a transfer characteristic at which the output pulse is reduced in width with respect to the input pulse essentially exponentially with frequency. Further according to the invention the passive electric network also has a linear phase characteristic whereby substantially only a pure time delay of inconsequential duration affects the translation of the desired reproduction signal pulses from the input to the output of the network. The transfer factor is derived from the ratio of the Gaussian expression of a pulse form compressed in the time domain by a predetermined compression factor divided by the Gaussian expression for the pulse form produced by the electromagnetic reproducing transducer, and has a substantially linear phase characteristic in the frequency domain. Thus substantially pure delay is interposed between the waveform and the output of the electromagnetic transducer and at the input of the constant resistance amplifier and detector circuitry.

In typical apparatus for realizing the increase in resolution by effecting a reduction of the width of the input pulse, the transfer of energy is maximized at a frequency equal to or higher than a fundamental frequency which is equal in magnitude to the reciprocal of the time width of the output pulse, or the reciprocal of the time width of the input pulse multiplied by the compression factor. More specifically, the component frequency at which maximizing takes place lies in a range of frequencies 1.4–1.5 times the fundamental frequency, within which range minimizing at a component frequency higher than the maximizing frequency is effective to eliminate the influence of higher component frequencies not necessary in the synthesis of the output pulse.

In order that the invention may be fully appreciated and the advantages thereof readily obtained in practice, the principle of the invention and the best mode which has been contemplated of applying that principle, is set forth hereinafter by means of an express embodiment of the invention, given by way of example only, with reference to the accompanying drawing, forming a part of the specification, and in which.

As shown by G. C. Bacon and A. S. Hoagland in their article "High Density Digital Magnetic Recording Techniques," proceedings of the IRE for January 1961, pp. 258–267, in digital magnetic recording the reproduced signal voltage obtained from an electromagnetic transducer is:

$$e_0 = CV\frac{\delta}{\delta x}\int_{-\infty}^{\infty} D(x)M(x-x_0)\,dx \qquad (1)$$

where $D(x)$ represents the sensitivity function of the transducer; and $M(x-x_0)$ is the change in surface magnetization of the recording medium.

In practice, $M(x-x_0)$ is much narrower in the time dimension than is $D(x)$. The sensitivity function $D(x)$ can be considered as a linear filter which degrades $M(x-x_0)$ during the reproduction process. According to the invention a compensating network is arranged to be used in conjunction with the transducer to overcome this undesirable effect, thus in effect obtaining a narrower output pulse. The filter consists of passive elements only in the interests of reliability, low cost and uniform functioning throughout the life of the equipment.

Figure 1:
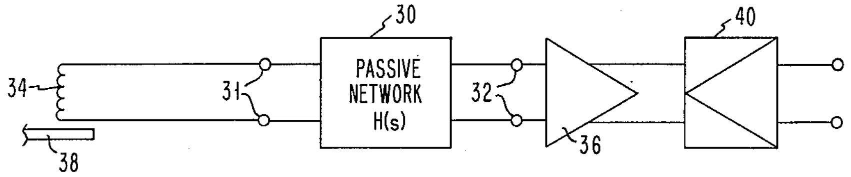
FIG. 1 is a functional diagram of a pulse signal reproducing system incorporating the invention.

FIG. 1 shows a portion of a digital pulse signal reproducing and detecting system of conventional components incorporating a passive electric network 30 according to the invention. The terminals 31 and 32 connect the input circuitry of the network 30 to an electromagnetic transducer 34 and the output circuitry of the network 30 to the input circuit of an amplifier 36. The transducer is arranged to reproduce pulse signals recorded on a magnetic medium 38, which signals are detected by a detector 40.

Figure 2:
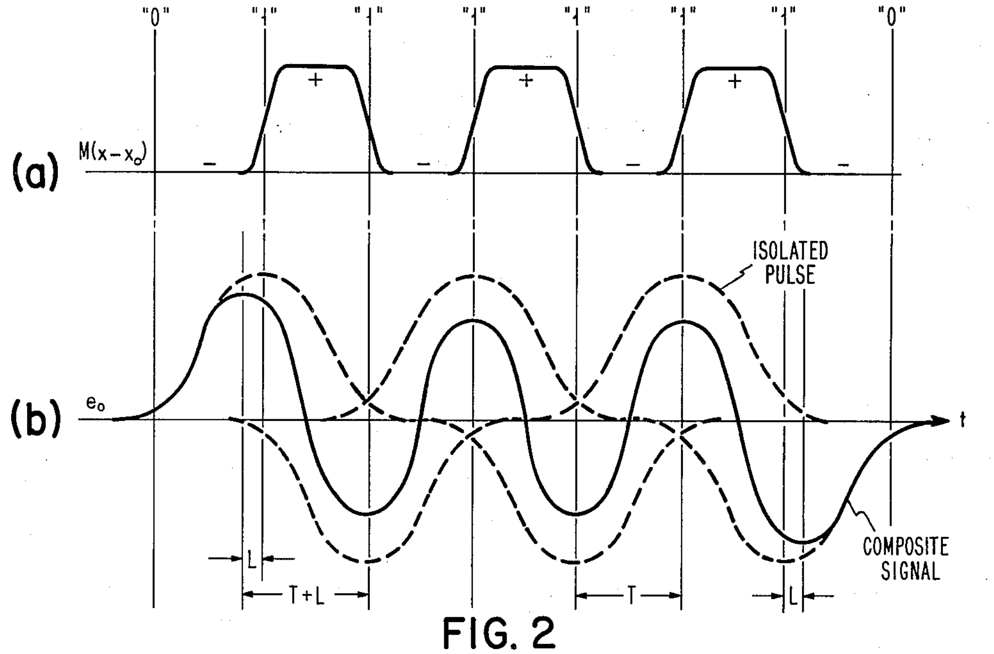

As the recording densities increase, the pulses appear closer together until bit crowding and bit-shift occur as illustrated at FIG. 2(*b*).

A non-return-to-zero or NRZI type of recording is shown at FIG. 2(*a*) (although this is not limiting). Every time a "unit" or "one" is recorded the surface magnetization polarity changes. When this happens, an output signal is produced by the transducer 34.

When a series of "units" or "ones" are sensed, the composite reproduction signal (as can be seen on an oscilloscope) is formed by the superposition of the individual pulses as shown at FIG. 2(*b*).

In the composite waveform of FIG. 2 the peak of all the pulses except the first and the last one are separated by the distance T (in time) which is constant. But for the first and last pulses, due to the absence of a pulse which would cause symmetry, the distance between the peak of these pulses to the corresponding neighboring pulse is $T+L$. In other words, these pulses appear shifted by the amount L. The effect of this shift is an out-of-step condition with the clock signal, which in turn leads to misinterpretation.

Also, due to the overlapping between neighboring pulses, the amplitude of each pulse is greatly diminished. This amplitude reduction imposes more rigorous requirements upon the sensing electronics, that is in amplification and noise elimination. These undesirable effects are aggravated as the density is increased.

According to the invention (a) each reproduced pulse is treated separately, both mathematically and physically, regardless of whether it is really isolated or in a sequence with other pulses; and (b) each pulse thus isolated is narrowed down to the point where its effect upon neighboring pulses is negligible; then (a) the recording density can be increased and (b) the pulse shift L eliminated.

Figure 3:
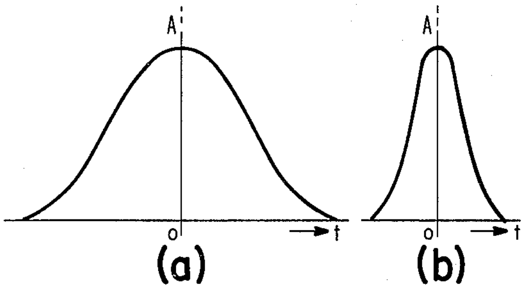
FIGS. 2–5 are graphical representations of waveforms in explanation of the invention.

In other words, the output waveform of the network 30 will be a narrower pulse as shown in FIG. 3(*b*) than the input pulse shown at FIG. 3(*a*).

Figure 4:
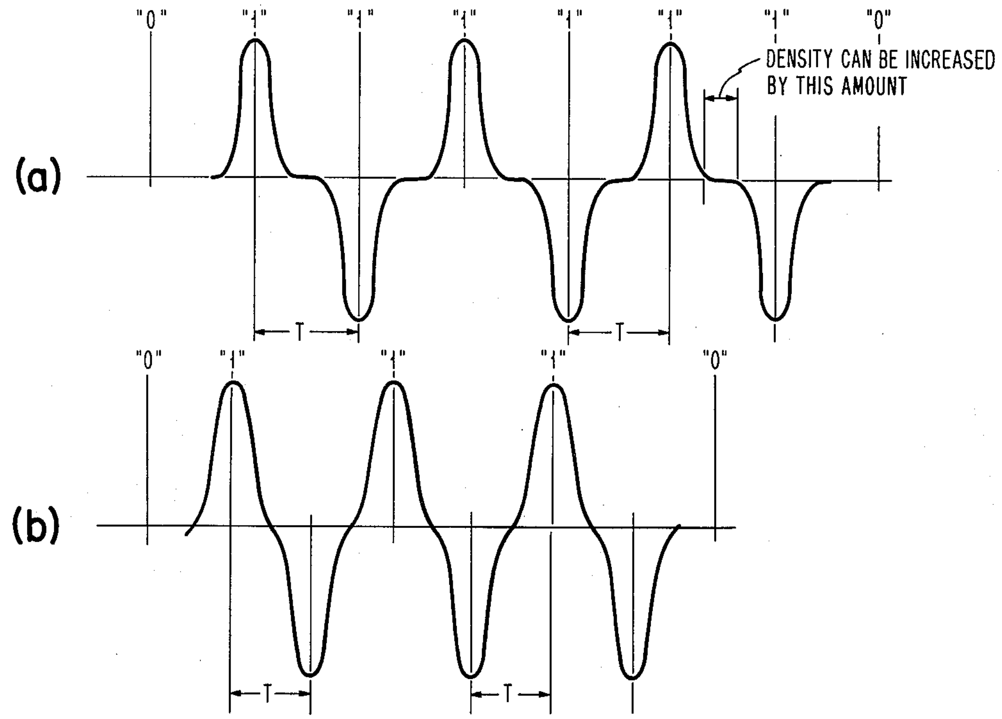

As a result of this change in pulse shape, the waveform of FIG. 2 is transformed by the network 30 into the waveform shown in FIG. 4(*a*), and the data pulse to be recorded can be recorded closer together by the amount shown in the FIG. 4(*a*). In such a case the output waveform would then appear composed of closely adjacent pulses as shown in FIG. 4(*b*).

In the above mentioned article Bacon and Hoagland show that on reproduction the existing magnetic field caused by the recorded magnetization of the surface is extremely weak, and hence the magnetic transducer will behave very nearly as a linear element.

As a consequence, it is possible to shape the reproduced pulse by means of a network composed of linear elements. It should be clearly understood that this network is not a filter in the usual sense; in other words, it is not a network to discriminate certain specified frequencies (synthesis in the frequency domain), but rather, it is a network specified by its transient behavior (synthesis in the time domain).

Let $f_i(t)$ represent the isolated signal from the reproducing transducer, and let $f_0(t)$ represent the desired narrower pulse from the network 30 with a transfer function H(*s*) such as for an input $f_i(t)$, an output $f_0(t)$ will result.

As stated previously, when a "unit" or a "one" is detected, the surface magnetization changes polarity. The output voltage waveform from the magnetic transducer resembles the Gaussian probability density function, as shown by J. W. Hung in an article "Transfer Function and Error Probability of a Digital Magnetic Tape Recording System," in the Journal of Applied Physics" for May 1960, vol. 31, No. 5, pp. 396S–397S.

Figure 5A:
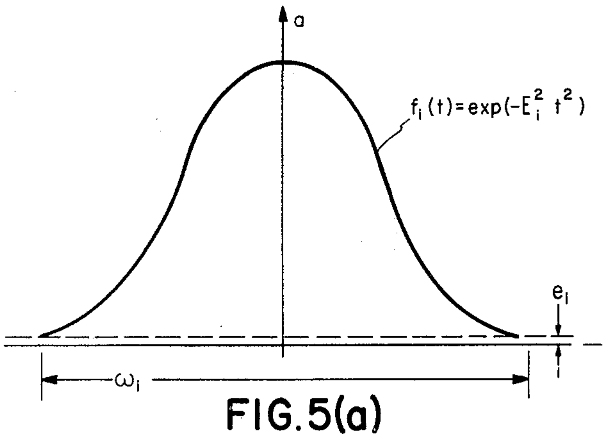
Figure 5B:
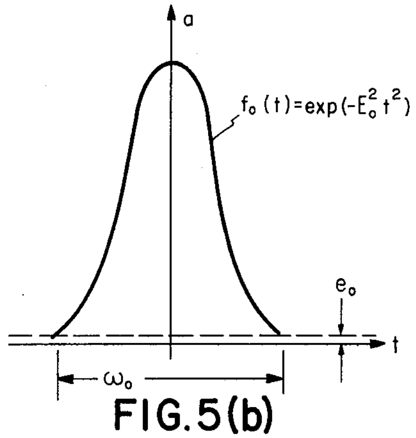

FIG. 5(*a*) shows the input signal $f_i(t)$ expressed as a Gaussian curve. The notation is:

$$f_i(t)=\exp(-E_i^2t^2) \qquad (2)$$

where $E_i$ is a factor involving the variance of the input pulse;

*t* is the time;

$W_i$ is the measured width of the given empirical pulse;

$e_i$=Admissible error for the analytical expression at $$t=\frac{W_i}{2}=\sigma$$

This is unavoidable since the Gaussian curve is asymptotic.

$$e_i=exp(-E_i^2\alpha^2) \qquad (3)$$

The only requirement for the output signal is that it be narrower than the input signal. Thus it may be in the form of a Gaussian curve, but with different parameters. FIG. 5(*b*) shows the output signal $f_0(t)$ expressed as a Gaussian curve.

For the output curve the notation is:

$$f_0(t)=\exp(-E_0^2t^2) \qquad (4)$$

where $E_0$ is a factor involving the variance of the output pulse;

*t* is the time;

$W_0$ is the desired width of the output pulse $e_0$=Admissible error at $$t=\frac{W_0}{2}=\beta$$

$$e_0=\exp(-E_0^2\beta^2) \qquad (5)$$

$$K=\text{Desired compression ratio}=\frac{W_i}{W_o} \qquad (6)$$

*Transfer function*

The transfer function of the network is given by $$H(s)=\frac{F_o(s)}{F_i(s)} \qquad (7)$$

The Fourier transform of the input pulse is:

$$F_i(j)\omega=F[f_i(t)]=\int_{-\infty}^{\infty}\exp(-E_i^2t^2)\exp(-j\omega t)dt \qquad (8)$$

$$=\int_{-\infty}^{\infty}\exp\left[-E_i^2\left(t^2+\frac{j\omega}{E_i^2}t-\frac{\omega^2}{4E_i^4}+\frac{\omega^2}{4E_i^4}\right)\right]dt$$

$$=\exp\left(-\frac{\omega^2}{4E_i^2}\right)\int_{-\infty}^{\infty}\exp\left[-E_i^2\left(t+\frac{j\omega}{2E_i^2}\right)^2\right]dt$$

Setting $E\left(t+\frac{j\omega}{2E_i^2}\right)$ equal to $X$; $dt=\frac{1}{E_i}dx$ The limits of integration do not change; therefore $$F_i(j\omega)=\frac{1}{E_i}\exp\left(-\frac{\omega^2}{4E_i^2}\right)\int_{-\infty}^{\infty}\exp(-x^2)dx=\frac{\sqrt{\pi}}{E_i}\exp\left(\frac{-\omega^2}{4E_i^2}\right)$$

For $s=j\omega$ (analytic continuation):

$$F_i(s)=\frac{\sqrt{\pi}}{E_i}\exp\left(\frac{s^2}{4E_i^2}\right) \qquad (9)$$

Similarly:

$$F_0(s)=\frac{\sqrt{\pi}}{E_0}\exp\left(\frac{s^2}{4E_0^2}\right) \qquad (10)$$

Substituting Equations 9 and 10 in Equation 8:

$$H(s)=\frac{E_i}{E_o}\exp\left(\frac{1}{E_0^2}-\frac{1}{E_i^2}\right)\frac{s^2}{4} \qquad (11)$$

Substituting Equation 7 in Equation 11:

$$H(s)=\frac{1}{K}\exp\left(\frac{1}{K^2}-1\right)\frac{s^2}{4E_i^2} \qquad (12)$$

Equation 12 still contains the parameter $E_i$. For convenience, the input pulse is normalized according to the Theorem of Scale Change as set forth by M. F. Gardner and J. L. Barnes, "Transients in Linear Systems," John Wiley and Sons, Inc. 1956, p. 226, by setting $E_i=1$. Equation 12 reduces to $$H(s)\frac{1}{K}\exp\left(\frac{1}{K^2}-1\right)\frac{s^2}{4} \qquad (13)$$

$$L[f_i(t)]=F_i(s)$$

then, for $\theta>0$:

$$L\left[f_i\left(\frac{t}{\theta}\right)\right]=\theta F_i(\theta s) \qquad (14)$$

Consequently, any given imput signal can be referred to the normalized one by a proper evaluation of the frequency scaling factor $\theta$.

For the normalized signal $\theta=1$, $E_i=1$. In this case, for $t=2$ seconds $$f_i(2)=e_i=\exp(-2^2)=0.018$$

since Max $[f_i(1)]=f_i(0)=1$, the error $e_i$ is only 1.8% of the maximum value of $f_i(t)$. Therefore, the normalized input pulse has a half-width (to be adjusted later on)

$$\frac{W_i}{2}=2\text{ seconds}$$

Setting $$\frac{K^2-1}{4K^2} \text{ equal to } \phi^2 \quad (15)$$

that is $$\phi=\frac{\sqrt{K^2-1}}{2K} \quad (16)$$

Figure 6:
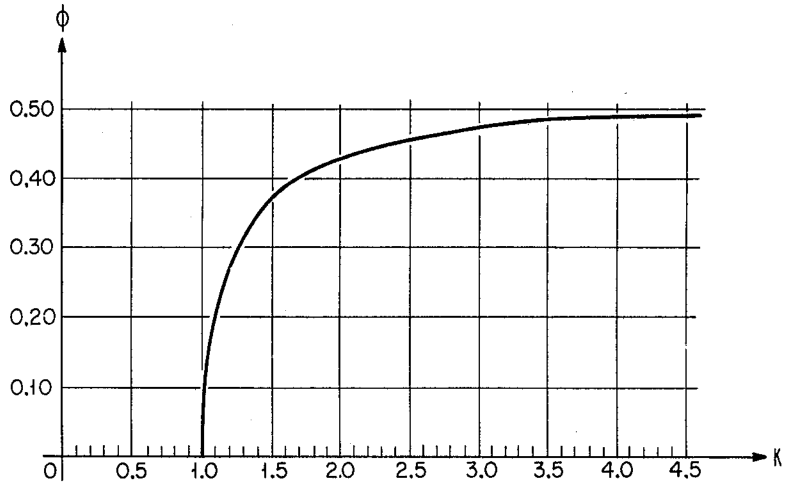
FIG. 6 is a graph of compression factor values.

The factor $\phi$ varies between 0 and 0.5 for variation of K between 1.0 and infinity as shown in FIG. 6.

Substituting Equation 15 in Equation 13

$$H(s)=\frac{1}{K}\exp(-\phi^2 s^2) \quad (17)$$

Since the transfer function given by Equation 17 is a trascendental, it must be approximated by a ratio of polynomials in $s$. Nevertheless, approximations to Equation 19 by ratios of polynomials in $s$ give non-Hurwitz polynomials in the denominator. This can be shown very easily by setting $$\phi^2 s^2 = z$$

With this substitution, Equation 17 becomes $$H(z)=\frac{1}{K}\exp(-z) \quad (18)$$

This expression can be identified with the delay function. Any type of approximation to Equation 18, either by a continued fraction expansion as given by W. H. Kautz, "Network Synthesis for Specified Transient Response," in the MIT Research Laboratory of Electronics Technical Report No. 209, dated April 23, 1952, p. 52, by Bessel polynomials as set forth by L. Storch, "Synthesis of Constant Time Delay Ladder Networks Using Bessel Polynomials," in the Proceedings of the IRE for November 1954, pp. 1666–1676, etc., establishes poles in the left half plane in an almost semi-circular fashion, as shown in FIG. 7.

Figure 7:
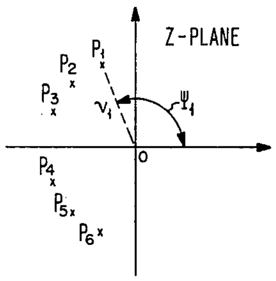
FIGS. 7 and 8 are graphical representations of mathematical relationships in explanation of the invention.

Consider the pole labeled $P_1$ in the $z$-plane of FIG. 7.

$$\gamma_1[\exp(j\psi_1)]$$

Figure 8:
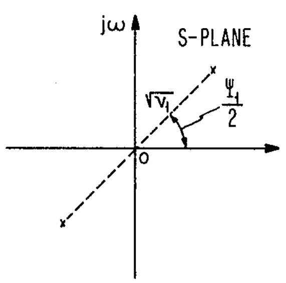

In making the transformation $\sqrt{z}\rightarrow s$, this pole in the $z$-plane establishes two poles in the $s$-plane:

$$\sqrt{\gamma_1}\left[\exp\left(j\frac{\Psi_1}{2}\right)\right] \text{ and } \sqrt{\gamma_1}\left\{\exp\left[j\left(\frac{\Psi_1}{2}+\pi\right)\right]\right\}$$

which are shown in FIG. 8. Since a similar operation can be described for all the poles of $H(z)$, the poles of any approximation to $H(s)$ have quadrantal symmetry.

Since each pole of the $z$-plane corresponds to two poles in the $s$-plane, one in the right half plane and the other in the left half plane, the resulting polynomial in $s$ is a non-Hurwitz polynomial. However instead of the transfer function, the magnitude function is approximated to obtain accurate results in the time domain.

*Magnitude function*

For $s=j\omega$, Equation 17 becomes $$H(j\omega)=\frac{1}{K}\exp(\phi^2\omega^2) \quad (19)$$

and since the imaginary component is zero Equation 19 is also the magnitude function, that is $$|H(j\omega)|=\frac{1}{K}\exp(\phi^2\omega^2) \quad (20)$$

and by the same reason the phase is $$\text{Arg } H(j\omega)=\arctan\frac{0}{\frac{1}{K}\exp(\phi^2\omega^2)}=0^\circ$$

$$|F_1(j\omega)|=\sqrt{\pi}\exp\left(-\frac{\omega^2}{4}\right) \quad (22)$$

$$|F_0(j\omega)|=\frac{\sqrt{\pi}}{K}\exp\left(-\frac{\omega^2}{4K^2}\right) \quad (23)$$

Figure 9A:
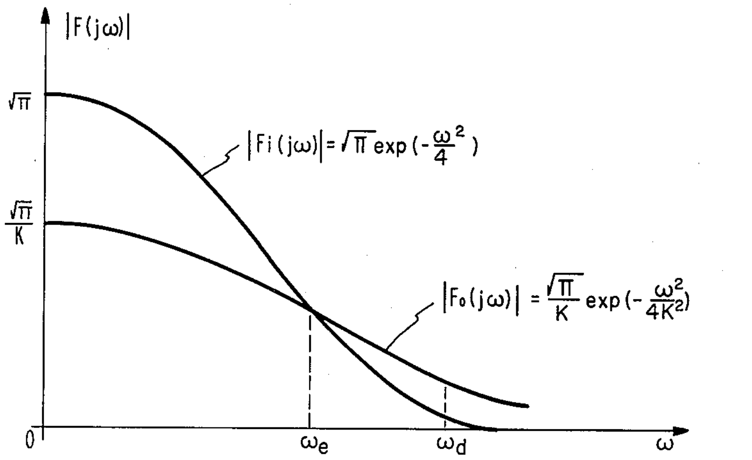
FIG. 9 is a graphical representation of magnitude approximations in explanation of the invention.
Figure 9B:
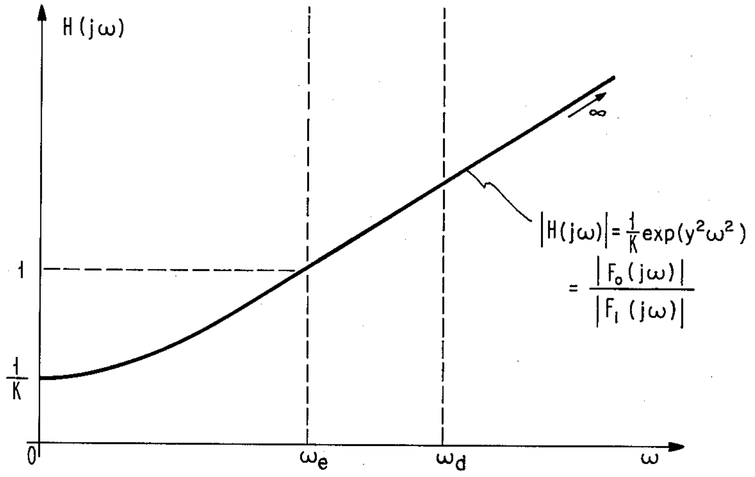

Curves of Equation 20, 22 and 23 are given in FIG. 9.

The frequency $\omega_e$ at which $|F_1(j\omega)|=|F_0(j\omega)|$ is found by solving $$\sqrt{\pi}\exp\left(-\frac{\omega_e^2}{4}\right)=\frac{\sqrt{\pi}}{K}\exp\left(-\frac{\omega_e^2}{4K^2}\right)$$

from which $$\omega_e=2K\sqrt{\frac{1nK}{K^2-1}} \quad (24)$$

To obtain realizable transfer functions, the approximations to $|H(j\omega)|$ must be band-width limited; that is, every approximation will hold only up to a frequency $f_d$ corresponding to an angular frequency $\omega_d$. The frequency $f_d$ is equal to (or greater than) the reciprocal of the time width $W_0$ of the output signal pulses. If the network is to be realized with passive elements only, and with the same impedance level, it will be necessary to accommodate some attenuation A where $\omega_d$ is greater than $\omega_e$.

From Equation 20 the magnitude squared function is:

$$|H(j\omega)|^2=\frac{1}{K^2}\exp(2\phi^2\omega^2) \quad (25)$$

Approximations to Equation 25 by ratios of polynomials in $\omega$ $$|H(j\omega)|^2=\frac{1}{K^2}\frac{C_0+C_2\omega^2+C_4\omega^4+\cdots}{D_0+D_2\omega^2+D_4\omega^4+\cdots} \quad (26)$$

must have certain well-known properties:

(a) Both the magnitude and magnitude squared functions must be even powers of $\omega$, and positive for all $\omega$.

(b) The C and D coefficients of Equation 26 must be real (although not necessarily positive). This requires that the poles and zeros of Equation 26 be conjugate if complex.

(c) The substitution of $s=j\omega$ in Equation 26 gives the product H $(s)$ H $(-s)$. The poles and zeros obtained with this substitution must have quadrantal symmetry.

To separate H $(s)$ from the product H $(s)$ H $(-s)$, consider all of the poles in the left half plane. The poles in the right half plane belong to H $(-s)$. Since H $(s)$ is a transfer function, zeros either in the right half plane, in the left half plane, or both are considered.

To approximate Equation 25 by a ratio of polynomials in $s$, the approximation by means of a continued fraction expansion offers very fast convergence. The general procedure is indicated very briefly. Setting $$2\phi^2\omega^2=z \quad (27)$$

and substituting in Equation 25

$$|H(z)|^2=\frac{1}{K^2}\exp(z) \quad (28)$$

it is known that $$\exp(z)={}_1F_1(b, b; z) \quad (29)$$

where ${}_1F_1$ is the confluent hypergeometric function, or Kummer function as discussed by L. J. Slater in "Confluent Hypergeometric Functions." Cambridge University Press, 1960, p. 2.

$${}_1F_1(b,c;z)=1+\frac{b}{c}z+\frac{b(b+1)}{c(c+1)}\frac{z^2}{2!}+\frac{b(b+1)(b+2)}{c(c+1)(c+2)}\frac{z^3}{3!}+\cdots \quad (30)$$

evaluated at $b=c$. In particular, making $b=c=1$, $$\exp(z)=F_1(1, 1; z) \quad (31)$$

From the continued fraction expansion of Gauss as set forth by H. S. Wall in "Analytic Theory of Continued Fractions," D. van Nostrand Company, 1948, p. 347;

$$\frac{{}_1F_1(b+1,c+1;z)}{{}_1F_1(b,c;z)}=\cfrac{1}{1-\cfrac{\frac{(c-b)}{c(c+1)}z}{1+\cfrac{\frac{(b+1)}{(c+1)(c+2)}z}{1-\cfrac{\frac{(c-b+1)}{(c+2)(c+3)}z}{1+\cfrac{\frac{(b+2)}{(c+3)(c+4)}z}{1-\cdots}}}}} \qquad (32)$$

With $b+o$, Equation 30 becomes ${}_1F_1$ $(o, c; z)=1$, and the continued fraction expansion of Equation 32 reduces to $${}_1(1,c+1;z)F_1=\cfrac{1}{1-\cfrac{\frac{1}{(c+1)}z}{1+\cfrac{\frac{1}{(c+1)(c+2)}z}{1-\cfrac{\frac{(c+1)}{(c+2)(c+3)}z}{1+\cfrac{\frac{2}{(c+3)(c+4)}z}{1-\cdots}}}}}$$

Finally, making $c=o$:

$${}_1F_1(1,1;z)=\exp(z)=\cfrac{1}{1-\cfrac{z}{1+\cfrac{\frac{z}{2}}{1-\cfrac{\frac{z}{6}}{1+\cfrac{\frac{z}{6}}{1-\cfrac{\frac{z}{10}}{1+\cfrac{\frac{z}{10}}{1-\cfrac{\frac{z}{14}}{1+\cdots}}}}}}}} \qquad (33)$$

If $N$=Number of terms taken in the expansion, the following table of approximants to exp $(z)$ is obtained:

For $$N=1:\frac{1}{1}$$

For $$N=2:\frac{1}{1-z}$$

For $$N=3:\cfrac{1}{1-\cfrac{z}{1+\frac{z}{2}}}=\frac{1}{1-\frac{2z}{2+z}}=\frac{2+z}{2-z}$$

etc.

Substituting $2\phi^2\omega^2$ for $z$:

For $$N=1:|H(j\omega)|^2\approx\left(\frac{1}{K^2}\right)\frac{1}{1}$$

For $$N=2:|H(j\omega)|^2\approx\left(\frac{1}{K^2}\right)\frac{1}{1-2\phi^2\omega^2}$$

For $$N=3:|H(j\omega)|^2\approx\left(\frac{1}{K^2}\right)\frac{2+2\phi^2\omega^2}{2-2\phi^2\omega^2}=\left(\frac{1}{K^2}\right)\frac{1+\phi^2\omega^2}{1-\phi^2\omega^2}$$

etc.

Substituting $s=j\omega$ approximations to H $(s)$ H $(-s)$ are:

For $$N=1:H(s)H(-s)\approx\left(\frac{1}{K^2}\right)\frac{1}{1}$$

For $$N=2:H(s)H(-s)\approx\left(\frac{1}{K^2}\right)\frac{1}{1+2\phi^2s^2}$$

For $$N=3:H(s)H(-s)\approx\left(\frac{1}{K^2}\right)\frac{1-\phi^2s^2}{1+\phi^2s^2}$$

and so on.

A table of useful approximations is given below.

$N=5$:

$$H(s)H(-s)=\left(\frac{1}{K^2}\right)\frac{3-3\phi^2s^2+\phi^4s^4}{3+3\phi^2s^2+\phi^4s^4}$$

Zeros:

$$\frac{1}{\phi}(\pm 1.271229882\pm j0.340625032)$$

Poles:

$$\frac{1}{\phi}(\pm 0.340625032\pm j1.271229882)$$

$N=9$:

$$H(s)H(-s)=\left(\frac{1}{K^2}\right)\frac{105-105\phi^2s^2+45\phi^4s^4-10\phi^6s^6+\phi^8s^8}{105+105\phi^2s^2+45\phi^4s^4+10\phi^6s^6+\phi^8s^8}$$

Zeros:

$$\frac{1}{\phi}(\pm 1.6572801\pm j0.801741003)$$

$$\frac{1}{\phi}(\pm 1.72038868\pm j0.252045949)$$

Poles:

$$\frac{1}{\phi}(\pm 0.801741003\pm j1.6572801)$$

$$\frac{1}{\phi}(\pm 0.252045949\pm j1.72038868)$$

$N=13$:

$$H(s)H(-s)\approx\left(\frac{1}{K^2}\right)\frac{10{,}395-10{,}395\phi^2s^2+4725\phi^4s^4-1260\phi^6s^6+210\phi^8s^8-21\phi^{10}s^{10}+\phi^{12}s^{12}}{10{,}395+10{,}395\phi^2s^2+4725\phi^4s^4+1260\phi^6s^6+210\phi^8s^8+21\phi^{10}s^{10}+\phi^{12}s^{12}}$$

Zeros:

$$\frac{1}{\phi}(\pm 1.9576912\pm j1.1474417)$$

Poles:

$$\frac{1}{\phi}(\pm 1.1474417\pm j1.9576912)$$

Zeros:

$$\frac{1}{\phi}(\pm 2.0374245\pm j0.64450787)$$

Poles:

$$\frac{1}{\phi}(\pm 0.64450787\pm j2.0374245)$$

Zeros:

$$\frac{1}{\phi}(\pm 2.0717609\pm j0.20936530)$$

Poles:

$$\frac{1}{\phi}(\pm 0.20936530 \pm j2.0717609)$$

$N=17$:

$$H(s)=\sum_{r=1}^{m}\left[\frac{P_r+Q_r s}{(s+\sigma_r)^2+\omega_r^2}\right] \tag{34}$$

Taking the inverse Laplace transform of equation (34):

$H(s)H(-s) \approx$ $$\left(\frac{1}{K^2}\right)\frac{2{,}027{,}025-2{,}027{,}025\phi^2s^2+945{,}945\phi^4s^4-270{,}270\phi^6s^6+51{,}975\phi^8s^8-6{,}930\phi^{10}s^{10}+630\phi^{12}s^{12}-36\phi^{14}s^{14}+\phi^{16}s^{16}}{2{,}027{,}025+2{,}027{,}025\phi^2s^2+945{,}945\phi^4s^4+270{,}270\phi^6s^6+51{,}975\phi^8s^8+6{,}930\phi^{10}s^{10}+630\phi^{12}s^{12}+36\phi^{14}s^{14}+\phi^{16}s^{16}}$$

Zeros:

$$\frac{1}{\phi}(\pm 2.2134019 \pm j1.4353271)$$

Poles:

$$\frac{1}{\phi}(\pm 1.4353271 \pm j2.2134019)$$

Zeros:

$$\frac{1}{\phi}(\pm 2.2998591 \pm j0.95972018)$$

Poles:

$$\frac{1}{\phi}(\pm 0.95972018 \pm j2.2998591)$$

Zeros:

$$\frac{1}{\phi}(\pm 2.3484243 \pm j0.55700647)$$

Poles:

$$\frac{1}{\phi}(\pm 0.55700647 \pm j2.3484243)$$

Zeros:

$$\frac{1}{\phi}(\pm 2.3709415 \pm j0.18296834)$$

Poles:

$$\frac{1}{\phi}(\pm 0.18296834 \pm j2.3709415)$$

The approximations given in the table are the diagonal entries (or stair-case entries of the Padé table for $$H(s)H(-s)$$

These entries fulfill the requirements enumerated for approximations to $|H(j\omega)|^2$ and $H(s)H(-s)$.

As stated previously, from each entry of the table the left half plane poles will constitute the poles of $H(s)$. In this fashion the approximate transfer functions can be constructed:

$$H(s)=\left(\frac{1}{K}\right)\frac{(s-z_1)(s-z_2)\cdots(s-z_n)}{(s-P_1)(s-P_2)\cdots(s-P_m)}$$

To obtain the transfer functions, two approximations have been necessary: (a) approximation of the emperical input signal $f_i(t)$ by a Gaussian curve approximation in the time domain); and (b) approximation of the magnitude squared function by a ratio of polynomials in $\omega$ (approximation in the frequency domain).

To verify the overall accuracy, it is necessary to obtain output signal when an empirical input signal $f_i(t)$ is applied to a network with a transfer function $H(s)$.

For this purpose, the inverse Laplace transform of each $H(s)$ is obtained and convoluted with $f_i(t)$. That is, for any entry $H(s)$ of the table, since the poles are known, a Heaviside partial expansion is undertaken:

$$h(t)=L^{-1}\left[\sum_{r=1}^{m}\frac{P_r+Q_r s}{(s+\sigma_r)^2+\omega_r^2}\right]$$

$$=\sum_{r=1}^{m}B_r\,[\exp(-\sigma_r t)]\,[\sin(\omega_r t+\Psi_r)] \tag{35}$$

The convolution of $h(t)$ with the empirical input signal $f_i(t)$ will give an output signal $f_0(t)$:

$$f_0(t)=\int_0^t f_i(t)h(t-\tau)d\tau=f_i(t)*h(t)$$

$$=f_i(t)\sum_{r=1}^{m}B_r\,[\exp(-\sigma_r t)]\,[\sin(\omega_r t+\Psi_r)] \tag{36}$$

Once a suitable transfer function has been decided upon, a network can be synthesized according to known technique. The 'Synthesis of Passive Networks" by E. A. Guillemin, John Wiley & Sons, 1957 and "Network Synthesis" by N. Balabanian, Prentice-Hall 1958 will be helpful.

*Example*

An example of calculation for a compression ratio $K=2$ will be considered. Since the normalized input pulse width is 4 seconds, the desired normalized output pulse will be $$W_0=\frac{W_i}{K}=\frac{4}{2}=2 \text{ seconds wide}$$

Substituting $K=2$ in Equation 16:

$$\phi=\frac{\sqrt{K^2-1}}{2K}=\frac{\sqrt{3}}{4}=0.433012701 \tag{37}$$

The entry $N=9$ is taken from the table. Substituting the value of $\phi$ calculated above, the following poles and zeros for $H(s)\ H(-s)$ are established:

Poles:

$\pm 1.85154154 \pm j3.82732446$
$\pm 0.582075188 \pm j3.97306747$

Zeros:

$\pm 3.82732446 \pm j1.85154154$
$\pm 3.97306747 \pm j0.582075188$

Disregarding the right half plane poles and the left half plane zeros, there remains:

Poles:

$-1.85154154 \pm j3.82732446$
$-0.582075188 \pm j3.97306747$

Zeros:

$+3.82732446 \pm j1.85154154$
$+3.97306747 \pm j0.582075188$

Since these are right half plane zeros, the transfer function is nonminimum-phase. The output pulse $f_0(t)$ will be delayed with respect to $f_i(t)$. This delay is quite tolerable since all the reproduction pulses will be delayed by the same amount, but the relative distance between adjacent pulses will remain unchanged.

With the poles and zeros calculated above, the transfer function is:

$$H(s)=\left(\frac{1}{2}\right)\frac{[(s-3.82732446)^2]+[(1.85154154)^2][(s-3.97306747)^2+(0.582075188)^2]}{[(s+1.85154154)^2]+[(3.82732446)^2][(s+0.582075188)^2+(3.97306747)^2]}$$

that is:

$$H(s)=\left(\frac{1}{2}\right)\frac{s^4-15.60078386s^3+95.02556847s^2-267.0633964s+291.4687835}{s^4+4.867233456s^3+38.51164079s^2+80.7526977s+291.4687835} \tag{38}$$

Figure 10:
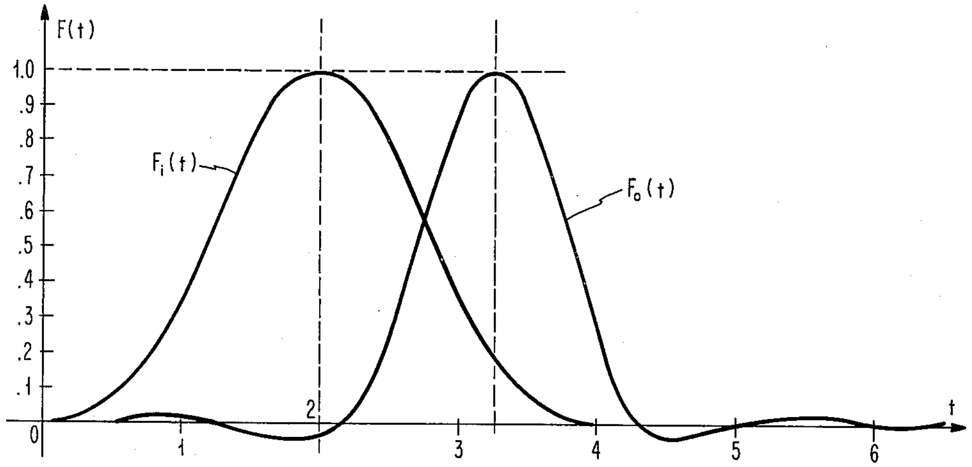
FIG. 10 is a graphical representation of input and output pulses obtained in operation of a passive network according to the invention.

The empirical input signal $f_i(t)$ convoluted with the inverse Laplace transform of equation gives an output pulse $f_0(t)$. The result obtained from computations in a computer is shown in FIG. 10. The maximum value of $f_0(t)$ has been normalized to 1. It is seen that the delay is 1.26 seconds. The width of the output pulse is 2 seconds, as expected.

Figures 11, 15:
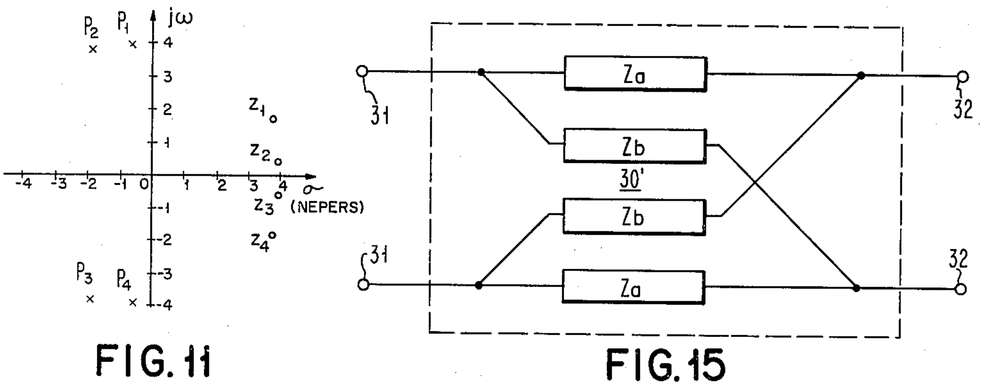
FIG. 11 is a graphical representation of mathematical relationships in explanation of the invention.
Figure 17A:
FIG. 17 is a drawing of oscilloscope traces obtained with a passive electric network according to the invention.
Figure 17B:
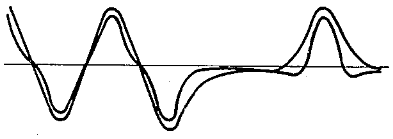
Figure 17C:
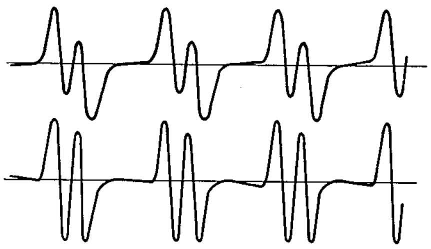
Figure 17D:
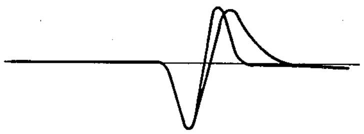

The pole and zero configuration is given in FIG. 11.

Although the primary interest is in the time domain behavior of the transfer function, it is necessary to calculate the magnitude and phase of the transfer function to verify the approximation to the magnitude function.

In Equation 38 setting $s=j\omega$:

$$H(j\omega)=\left(\frac{1}{2}\right)\frac{(\omega^4-95.02556847\omega^2+291.4687835)+j(15.60078386\omega^3-267.0633964\omega)}{(\omega^4-38.51164079\omega^2+291.4687835)+j(-4.867233456\omega^3+80.7526977\omega)}$$

The magnitude function is:

$$|H(j\omega)|=\left(\frac{1}{2}\right)\sqrt{\frac{(\omega^4-95.02556847\omega^2+291.4687835)^2+(15.60078386\omega^3-267.0633964\omega)^2}{(\omega^4-38.51164079\omega^2+291.4687835)^2+(4.867233456\omega^3-80.75269772\omega)^2}}$$

Figure 12:
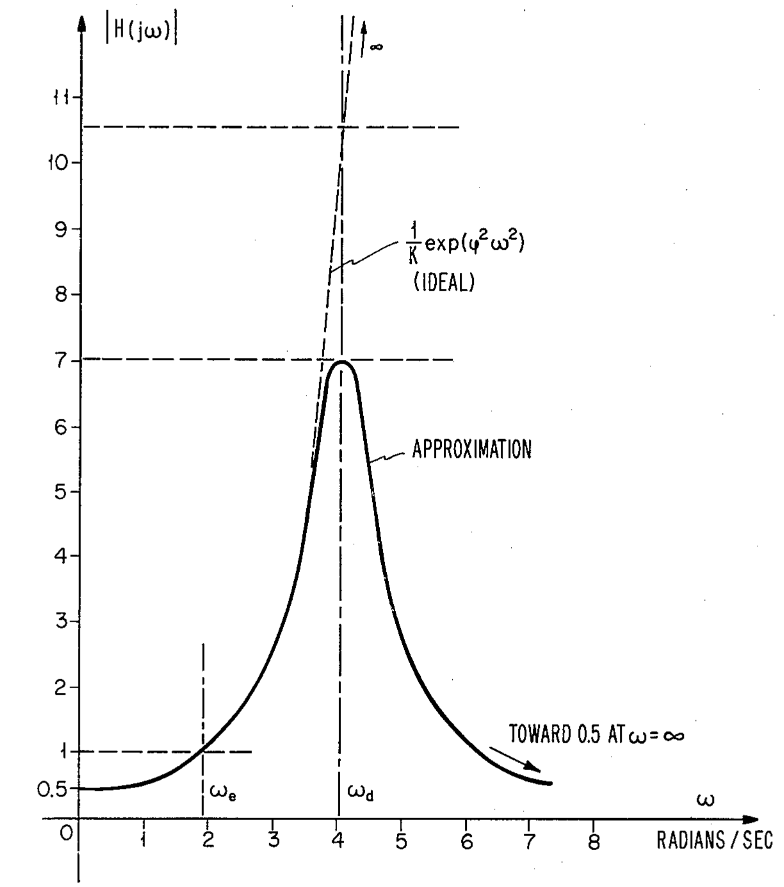
FIG. 12 is a graphical representation of the magnitude against frequency relationship.

A plot of $H(j\omega)$ for values from zero to 8 radians/sec., is shown in FIG. 12. The approximation is good only up to $\omega_d=4.03356$ radians/sec. At this frequency:

$$\text{Max}\,|H(j\omega)|=7.01232595$$

The phase is given by $$\text{Arg}\,H(j\omega)=\arctan\frac{15.60078386\omega^3 267.0633964}{\omega^4-95.02556847\omega^2+291.4687835}-\arctan\frac{-4.867233456\omega^3+80.75269772\omega}{\omega^4-38.51164079\omega^2+291.4687835}$$

Figure 13:
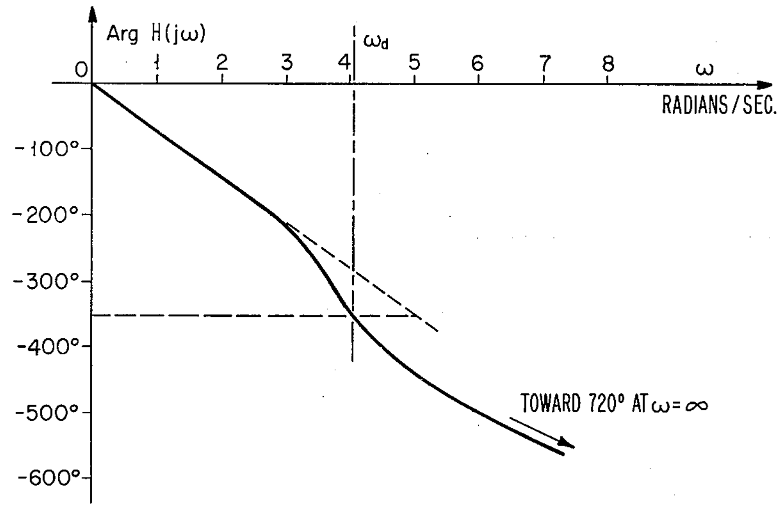
FIG. 13 is an illustration of the phase relationships.

A plot of Arg $H(j\omega)$ for values of $\omega$ from zero to 8 radians/sec., is shown in FIG. 13. It is observed that up to the angular frequency of approximation, $\omega_d$, the phase can be considered linear to an acceptable degree of accuracy.

*Network synthesis*

Given a particular transfer function which fulfills well known realizability requirements, there are in general many possible networks which could be realized. Only one of the many possible solutions is discussed below.

Figure 14:
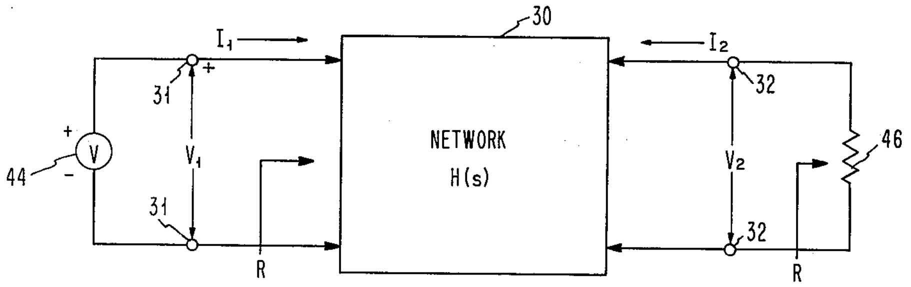
FIGS. 14 and 15 are diagrams useful in an understanding of the synthesis of a network.

In practice the magnetic transducer is connected directly to an amplifier. The network must be inserted in a desirable location. As far as input and output terminals are concerned, the network appears as in FIG. 14; that is, the network is connected between a voltage generator 44 and a purely resistive load 46. Since the insertion of the network must disturb the previous configuration as little as possible, a constant-R configuration, as shown in FIG. 14 is desirable.

In the practical case under consideration the network is connected to a critically balanced push-pull amplifier. Consequently, it is desirable to load both lines by the same amount, and a symmetrical lattice network of the type shown in FIG. 15 will be developed.

In terms of the transfer function the branch impedances of the symmetrical lattice network are $$Z_a=\frac{1-H(s)}{1+H(s)} \quad (40)$$

$$Z_b=\frac{1}{Z_a} \quad (41)$$

Details of this relationship will be found in the "Introduction to Modern Network Synthesis," M. E. Van Valkenburg, John Wiley and Sons, Inc., 1960, p. 348. As related by A. Talbot in "A New Method of Synthesis of Reactance Networks" appearing in the "Proceedings of the I.E.E." (London), Part IV, 101, Monograph No. 77, 1954, pp. 73–90, Theorem 4, for $Z_a$ and $Z_b$ to be positive real, the requirements (1) H(s) has no poles in the right half plane or on the imaginary axis.

(s) $|H(j\omega)|\leqq 1$ for $0\leqq\omega\leqq\infty$

The transfer function H(s) given by Equation 38 fulfills the first requirement since all the poles, as seen in FIG. 11, are in the left half plane.

To fulfill the second requirement, it is necessary to multiply H(s) by $$A\leq\frac{1}{\text{Max.}\,|H(j\omega)|} \quad (42)$$

Substituting Equation 39 in Equation 42, $$A=\frac{1}{7.01232595} \quad (43)$$

which gives an attentuation of $$20\log(7.012326)=16.917\text{ db}$$

Multiplying Equation 38 by Equation 43

$$H(s)=\frac{0.0713030175s^4-1.112382964s^3+6.775609772s^2-19.04242602s+20.78280377}{s^4.867233456s^3+38.51164079s^2+80.75269772s+291.4687835} \quad (44)$$

Figure 16:
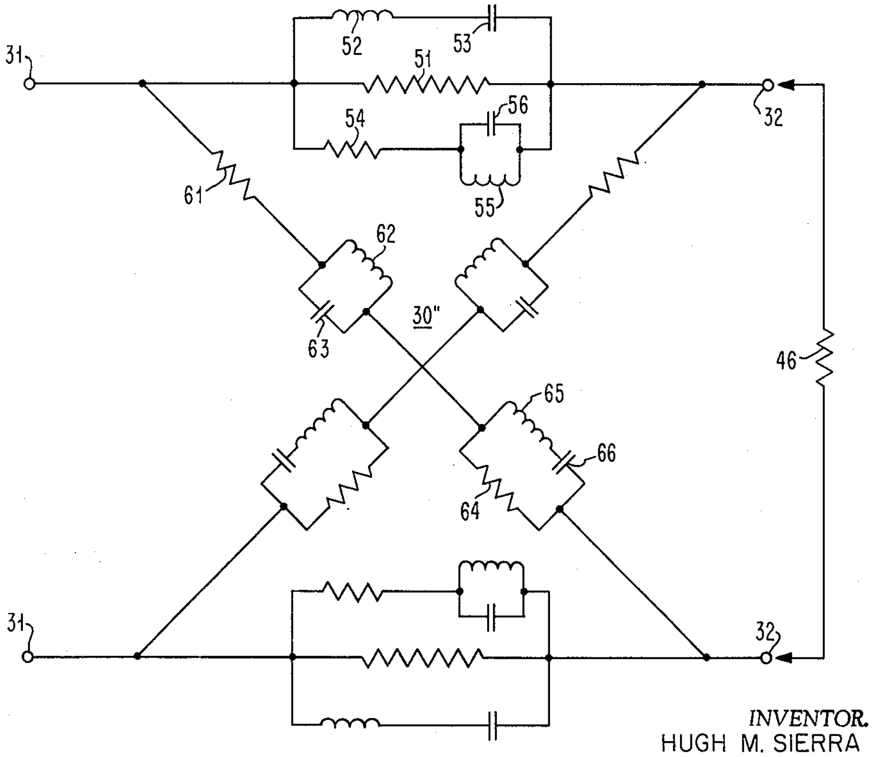
FIG. 16 is a schematic diagram of a passive electric network according to the invention.

Substituting Equation 44 in Equations 40 and 41, the network shown in FIG. 16 is obtained. Normalized values of the components are as follows:

| Ref. No. | Value | Unit | Component |
|---|---|---|---|
| 46 | 1.0 | Ohm | Resistor. |
| 51 | 2.6145069 | do | Do. |
| 52 | 0.68905512 | Henry | Inductor. |
| 53 | 0.08695996 | Farad | Capacitor. |
| 54 | 1.19689295 | Ohm | Resistor. |
| 55 | 0.478123137 | Henry | Inductor. |
| 56 | 0.119755804 | Farad | Capacitor. |
| 61 | 0.3824813 | Ohm | Resistor. |
| 62 | 0.08695996 | Henry | Inductor. |
| 63 | 0.086903512 | Farad | Capacitor. |
| 64 | 0.771073664 | Ohm | Resistor. |
| 65 | 0.119755804 | Henry | Inductor. |
| 66 | 0.47812137 | Farad | Capacitor. |

The normalized input pulse was considered 4 seconds wide. Neverthless, this normalized width was chosen quite arbitrarily. By assuming a Gaussian approximation, a pulse which starts with a step funcion whose height is 1.8 percent high was considered. In practice, the pulses coming from the magnetic transducer do not have these step functions. This discrepancy causes the output pulse to have overshoots, as shown in FIG. 10, when an empirical input pulse is convoluted with the impulse response. An adjustment of the width of the normalized input pulse is necessary.

By varying the width of the input pulse in computer simulation and in laboratory testing, it was found that these overshoots are greatly minimized, without detriment to the compression factor, by using a pulse 10 percent wider than originally assumed.

For pulse W microseconds wide, the frequency scaling factor is then $$\theta=\frac{44\times10^6}{W} \quad (45)$$

if $R_n$, $L_n$ and $C_n$ are the normalized resistors, inductors and capacitors of FIG. 19, the actual values will be $$R_{act}=RR_n$$

$$L_{act}=\frac{WRL_n}{4.4\times10^6} \quad (47)$$

$$C_{act}=\frac{WC_n}{4.4\times10^6\times R} \quad (48)$$

Applying Equations 46, 47 and 48 to FIG. 16, the denormalized values below are obtained in terms of pulse width W and load resistor R.

| Ref. No. | Value | Unit | Component |
|---|---|---|---|
| 46 | R | Ohms | Resistor. |
| 51 | 2.6145069R | Ohms | Resistor. |
| 52 | 0.15660344WR | Microhenries | Inductor. |
| 53 | 0.01976362W/R | Microfarads | Capacitor. |
| 54 | 1.29689295R | Ohms | Resistor. |
| 55 | 0.10866395WR | Microhenries | Inductor. |
| 56 | 0.02721623W/R | Microfarads | Capacitor. |
| 61 | 2.6145069R | Ohms | Resistor. |
| 62 | 0.15660344WR | Microhenries | Inductor. |
| 63 | 0.019763627W/R | Microfarads | Capacitor. |
| 64 | 1.29689295R | Ohms | Resistor. |
| 65 | 0.10866395WR | Microhenries | Inductor. |
| 66 | 0.02721723W/R | Microfarads | Capacitor. |

*Results*

A passive electric network was constructed for use with a pulse 4 microseconds wide. This pulse was applied to a linear amplifier whose input impedance is a resistance of 4 kilohms. Substituting $W=4$ and $R=4\times10^3$ the network shown in FIG. 16 was constructed with the following values of components.

| Ref. No. | Value | Unit | Component |
|---|---|---|---|
| 46 | 4 | Kilohms | Resistor. |
| 51 | 10.46 | Kilohms | Resistor. |
| 52 | 2.506 | Millihenry | Inductor. |
| 53 | 19.76 | Micromicrofarads | Capacitor. |
| 54 | 5.188 | Kilohms | Resistor. |
| 55 | 1.739 | Millihenry | Inductor. |
| 56 | 27.22 | Micromicrofarads | Capacitor. |
| 61 | 1.530 | Kilohms | Resistor. |
| 62 | 0.3162 | Millihenry | Inductor. |
| 63 | 156.6 | Micromicrofarads | Capacitor. |
| 64 | 3.084 | Kilohms | Resistor. |
| 65 | 0.4355 | Millihenry | Inductor. |
| 66 | 108.7 | Micromicrofarads | Capacitor. |

With these values of components the constructed network comprised series resonant circuits 52–53, tuned to 715 kc./s. maximizing transmission of energy at that frequency and parallel resonant circuits 55–56 tuned to 732 kc./s. minimizing transmission of energy at the latter frequency. Complementary parallel circuits 62–63 and series circuits 65-66 in the shunt arms enhanced the effect of the transmission and rejection of energy in the forward arms. The base of fundamental frequency $f_d$ of the network defined earlier was 500 kc./s. for these values, resulting in the maximizing and minimizing of energy transmission in a band between 1.4 and 1.5 times the fundamental frequency.

FIG. 17 shows curves obtained with this network using a dual-beam oscilloscope. The magnetic transducer used in these tests was originally designed for a density of 450 bits per inch.

FIG. 17(*a*) shows the 4 microsecond input pulse, and superimposed upon it the 2 microsecond pulse obtained from the network. The peaks of the pulses were made to coincide on the oscilloscope.

FIG. 17(*b*) shows a series of pulses written at 450 b.p.i. on a magnetic disk. The narrower pulses obtained from the network are superimposed.

FIG. 17(*c*) shows a series of pulses written at 900 b.p.i. The upper trace is the output from the transducer, and it is seen that due to pulse crowding the amplitude of adjacent pulses varies considerably. The lower trace is the output from the network, and the amplitude of the pulses remains fairly constant.

FIG. 17(*d*) shows two adjacent pulses at 900 b.p.i. The outputs from the transducer and from the network are superimposed. The peaks of the pulses obtained from the transducer are seen to be more widely separated than the ones obtained from the network; consequently at this density the network does not produce as much bit-shift as the transducer.

Figure 18:
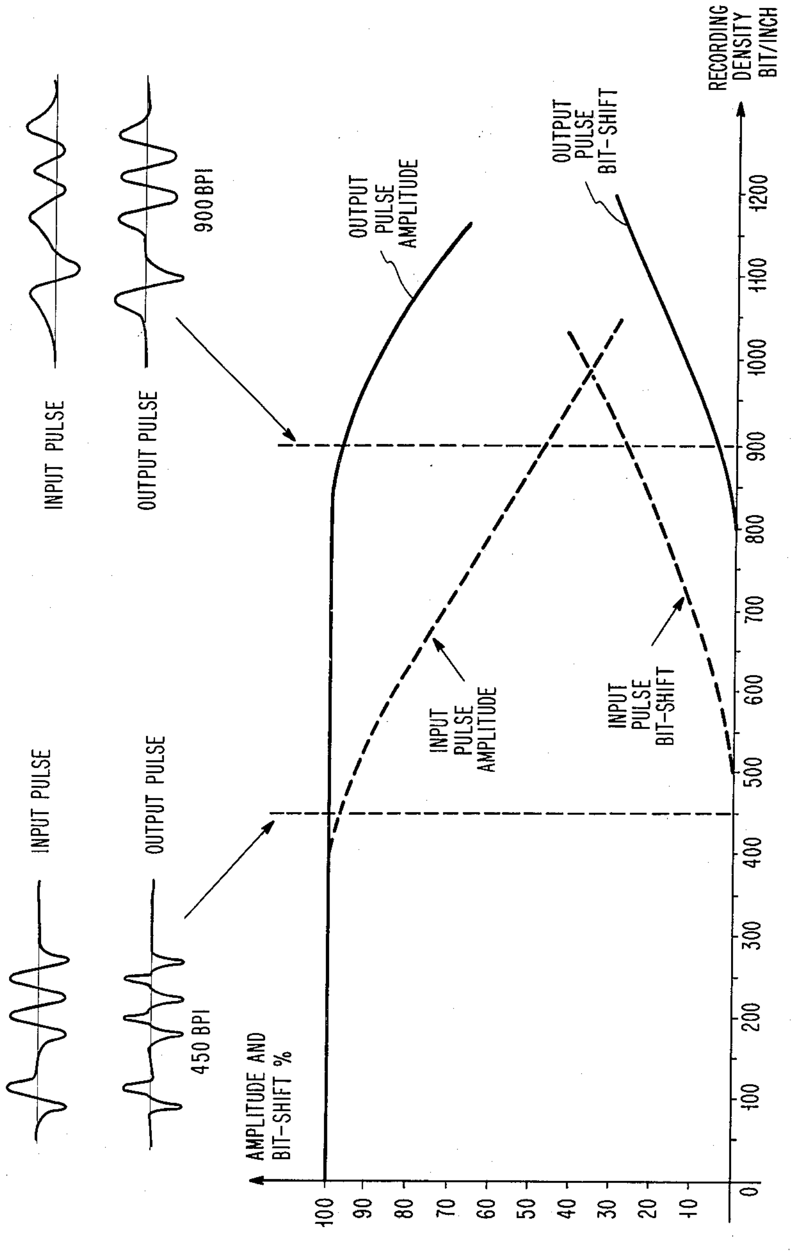
FIG. 18 is a diagram of a quantitative evaluation of a passive electric network according to the invention.

FIG. 17 only offers a qualitative, pictorial account of the network behavior. A quantitative evaluation is shown in FIG. 18. The relative amplitude of the pulses and their bit-shift are offered at several recording densities. It is seen that the amplitude obtained from the transducer decays after 450 bits per inch, as originally designed. Also at this density the bit-shift starts to increase. Nevertheless, with the same transducer the output from the network shows that the relative amplitude of the pulses starts to decay at 900 b.p.i., and also at this density the bit-shift starts to increase. Consequently, by the mere insertion of the network of the invention a magnetic recording system originally designed for 450 b.p.i. can be rendered useful up to 900 b.p.i.

While the invention has been particularly shown and described with reference to a preferred embodiment thereof, it will be understood that changes in the form and details may be made therein by those skilled in the art without departing from the spirit and scope of the invention.

The invention claimed is:

1. Apparatus for increasing the resolution of data recorded on a magnetic recording medium in a system of the type including an electromagnetic transducer arranged adjacent said recording medium for producing an electric pulse of given width $W_1$ in response to relative movement between said recording medium and said electromagnetic transducer, and a substantially constant resistance load device coupled to said electromagnetic transducer, comprising a passive electric network interposed between said electromagnetic transducer and said load device for reducing the width of said pulse as delivered across said load device by a predetermined factor K to a period $W_0$ equal to $W_1/K$, said passive electric network having at least one circuit resonant at a first component frequency $f_1$ lying between 1.0 and 1.5 times a fundamental frequency equal to $K/W_1$ and connected for maximizing the transmission of energy at said first frequency $f_1$ to said load device, and at least one other circuit resonant at a second component frequency $f_2$ higher than the first frequency $f_1$ and connected for minimizing the transfer of energy at said second frequency $f_2$.

2. Apparatus for increasing the resolution of data recorded on a magnetic recording medium in a system of the type including an electromagnetic transducer arranged adjacent said recording medium for producing an electric pulse of given width $W_1$ in response to relative movement between said recording medium and said electromagnetic transducer, and a substantially constant resistance load device coupled to said electromagnetic transducer, comprising a passive electric network interposed between said electromagnetic transducer and said load device for reducing the width of said pulse as delivered across said load device by a predetermined factor K to a period $W_0$ equal to $W_1/K$, said passive electric network having at least one forward arm comprising a series resonant circuit peaked at a first frequency $f_1$ connected in parallel with a parallel resonant circuit peaked at a second component frequency $f_2$ higher than said first frequency $f_1$, said first and second component frequencies lying between 1.4 and 1.5 times a fundamental frequency $f$ equal to $K/W_1$, and at least one shunt arm comprising circuits complementing said resonant circuits and connected in series, thereby maximizing forward transmission of energy at said first component frequency $f_1$ and minimizing transmission of energy at said second component frequency, said circuits having component values at which the component frequency time delay is substantially linear with frequency from zero out to said first component frequency $f_1$.

3. Electric circuitry for recovering information recorded on a given magnetic storage medium by impressing recording currents on an electromagnetic transducer for recording said information in the form of binary digits at a density at which the reproduction of a binary digit under consideration by said electromagnetic transducer in the absence of said circuitry is distorted beyond utilization by binary digits stored on said medium adjacent said digit under consideration, comprising a substantially constant resistance passive electric network having input terminals coupled to said electromagnetic transducer and output terminals, and a substantially constant resistance load coupled to said output terminals of said network, said electric network having at least one forward arm comprising a series resonant circuit peaked at a first frequency $f_1$ connected in parallel with a parallel resonant circuit peaked at a second component frequency $f_2$ higher than said first frequency $f_1$, and at least one shunt arm comprising circuits complementing said resonant circuits and connected in series, said first frequency $f_1$ lying in a range of frequencies between 1.0 and 1.5 times a fundamental frequency $f$ equal to the magnitude of the recorded pulse width divided by the compression factor and said second frequency $f_2$ lying in a range between 1.4 and 1.5 times said fundamental frequency $f$, thereby maximizing forward transmission of energy at said first component frequency $f_1$ and minimizing transmission of energy at said second component frequency $f_2$ permitting recovery of said information, said electric network having substantially linear phase characteristic in the frequency domain whereby substantially pure delay is interposed between the waveform at the output of said electromagnetic transducer and at the input of said constant resistance load up to said first frequency $f_1$.

References Cited by the Examiner

UNITED STATES PATENTS

| | | | |
|---|---|---|---|
| 2,657,276 | 10/53 | Eliot et al. | 179—100.2 |
| 2,836,715 | 5/58 | Spielberg et al. | 333—20 |

IRVING L. SRAGOW, *Primary Examiner*.